United States Patent [19]
Johnssen

[11] Patent Number: 6,074,769
[45] Date of Patent: Jun. 13, 2000

[54] METHOD OF GENERATING ELECTRIC ENERGY FROM REGENERATIVE BIOMASS

[75] Inventor: Wolf Johnssen, Munich, Germany

[73] Assignee: Hannelore Binsmaier Nee Gallin-Ast, Erdweg-Grossberghofen, Germany

[21] Appl. No.: 08/809,310

[22] PCT Filed: Aug. 29, 1995

[86] PCT No.: PCT/EP95/03399

§ 371 Date: Apr. 2, 1997

§ 102(e) Date: Apr. 2, 1997

[87] PCT Pub. No.: WO96/07210

PCT Pub. Date: Mar. 7, 1996

[30] Foreign Application Priority Data

Aug. 30, 1994 [DE] Germany ............................ 44 30 750
Feb. 4, 1995 [EP] European Pat. Off. ............. 95101521

[51] Int. Cl.[7] ................................................... H01M 8/16
[52] U.S. Cl. ................................... 429/2; 429/17; 429/19
[58] Field of Search .................................. 429/2, 17, 19

[56] References Cited

U.S. PATENT DOCUMENTS

| | | | |
|---|---|---|---|
| 3,421,942 | 1/1969 | McBaine ........................................ | 429/2 |
| 4,988,580 | 1/1991 | Ohsaki et al. ................................. | 429/19 |
| 5,147,735 | 9/1992 | Ippommatsu et al. ........................ | 429/17 |
| 5,500,306 | 3/1996 | Hsu et al. .................................... | 429/19 X |
| 5,707,762 | 1/1998 | Johnssen ....................................... | 429/2 |
| 5,736,026 | 4/1998 | Patel et al. ................................... | 429/19 X |

FOREIGN PATENT DOCUMENTS

| | | |
|---|---|---|
| 0 345 908 A1 | 12/1989 | European Pat. Off. . |
| 0 564 796 A1 | 10/1993 | European Pat. Off. . |
| 1 592 278 | 12/1970 | Germany . |
| 1253168 | 9/1989 | Japan . |
| 4274172 | 9/1992 | Japan . |
| WO 95/15590 | 6/1995 | WIPO . |

OTHER PUBLICATIONS

Small Scale Gasification of Biomass to Produce a Low BTU Gas, by Robert Hodam et al., Fuels Off., Symp. Pap: Energy Biomass Wastes (1978) (Month Unknown).

Technical and Economic Assessmnet of Biomass–Based Fuel Cell Power Systems, by E.I. Wan (Energy Biomass Wastes Sep. 1995.

Potential Biomass Resources of Sicily . . . , by V. Alderucci et al. (Applied Energy 45 (1993) 219–240) (Month N/A).

*Primary Examiner*—Stephen Kalafut
*Attorney, Agent, or Firm*—Herbert Dubno

[57] ABSTRACT

The invention concerns a method of generating electrical energy from biomass which is produced in a biomass-production module. The biomass is gassified in a reformer module to form a hydrogenous crude gas from which a purified gas with a higher hydrogen content is produced. Electrical energy is generated from the purified gas in a converter module. In this case, biomass with low sulfur and chlorine contents is produced by a suitable fertilizing of plants. The reformer module operates with at least one allothermic reformer, the dwell time of the biomass or crude gas in the reformer, and the temperature and pressure therein being set so that the alkali compounds can be removed from the reformer with any ash produced. Tar is gassified in the reformer to form carbon monoxide and hydrogen. A purified containing less than 1% carbon monoxide is produced in the crude gas processing module. The purified gas is reacted in at least one PEM fuel cell to produced electric current, the operating temperature of the fuel cell, and both the water content and pressure of the purified fuel gas being adapted to one another to produce an optimum flow density.

10 Claims, 2 Drawing Sheets

METHOD OF GENERATING ELECTRIC ENERGY FROM REGENERATIVE BIOMASS

CROSS REFERENCE TO RELATED APPLICATIONS

This application is a national stage of PCT/EP95/0399 filed Aug. 29, 1995 and based, in turn, upon German National Application P 44 30 750.0 filed Aug. 30, 1994 and European application 95 101 521.3 filed Feb. 4, 1995 under the International Convention.

1. Field of the Invention

The invention relates to a method, as well as a systema for generating electric energy from regenerative biomass produced from plants, whereby in a reformer a crude gas containing hydrogen is produced, whereby in a crude gas processing device a purified fuel gas with a high hydrogen content is formed and whereby in a converter module with PEM fuel cells electric energy is generated from the purified fuel gas. The biomass can be produced from plants grown especially for this purpose. However the biomass can also be formed from vegetable waste material. The term "PEN" stands for "proton exchange membrane" and/or for "polymer-electrode membrane" which are synonyms.

2. Background of the Invention

PEM fuel cells as a basic construction have a polymer membrane membrane. On one side of the membrane cathodes membrane. Thereby on one side of the membrane the cathodes are formed and on the other side of the Membrane the anodes are provided. A cathode chamber and an anode chamber are assigned to the cathodes and anodes. A hydrogen-containing fuel gas is directed to the anode chamber and the hydrogen is oxidized to protons at the anode. The protons have a high nobility in the polymer membrane and travel to the cathode, where for instance atmospheric oxygen supplied to the cathode chamber is reduced to water. Since the polymer membrane is electrically insulated, based on this chemical process it is possible to pick up a direct current from the electrodes,, which optionally can be converted into a normal network alternating voltage. Further details about PEM fuel cells can be found in "Fuel Cells, a Handbook", K. Chinoshita, Lawrence Berkeley Laboratory, Berkeley, Calif., USA, 1988, Chapter 6.2.

A method and a device using biomass for generating electrical energy are known from "Department of Energy (DOE), November 1992, DE 93000009". In the heretofore known method at first methanol is produced from the biomass. After that the methanol is converted in a reformer into hydrogen containing crude gas. In a crude gas processing device the carbon monoxide formed during conversion is removed from the crude gas, whereby no further use of the carbon monoxide takes place. The obtained purified fuel gas, freed from carbon monoxide, is finally converted into an electrical current in PEM fuel cells.

The disadvantages of the known process is that at first methanol has to be produced in an expensive manner from the biomass, that the carbon monoxide is lost to the electricity producing process in spite of its calorific value, and especially that there is no nodular construction with mutual adjustment and setting of the production parameters between the various modules.

OBJECT OF THE INVENTION

The a method which utilizes the energy content of the biomass to a greater extent and works reliably for a longer period of time, as well as to provide a system for implementing the improved method.

SUMMARY OF THE INVENTION

This object is attained according to the invention in a method for generating electric energy from regenerative biomass, produced from plants, particularly a biomass from perennial $C_4$-plants, whereby biomass is produced in a biomass production module, whereby in a reformer module the biomass is converted into a crude gas containing hydrogen, whereby in a crude gas processing module a fuel gas with high hydrogen content is formed from the crude gas and whereby in a converter module electric energy is generated from the purified fuel gas, with the following combination of features:

a) with the biomass production module a biomass with low sulfur and chlorine contents is produced by suitably fertilizing the plants, b) the reformer module operates with at least one allothermic reformer to which steam is supplied as a gasifying agent, the dwelling time of the biomass and/or of the crude gas in the reformer, the pressure and the temperature in the reformer being set so that the alkali compounds originating from the biomass can be removed from the reformer with the resulting ash, and whereby the tar formed as an intermediate product in the reformer cart be basically gasified into carbon oxides and hydrogen, c) in the crude gas processing module a purified fuel gas is formed, with a carbon oxide content of less than 1%, d) the purified fuel gas is converted to electrical current in the converter module by means of at least one PEM fuel cell, whereby the operating temperature of the PEM fuel cell, the water content of the purified fuel gas and the pressure of the purified fuel gas are adjusted to one another so as to produce a high power density.

$C_4$ plants are plants which during the photosynthetic conversion of carbon dioxide bind four carbon atoms. Perennial plants are plants which form an extensive root system and grow for several years in a row. Perennial $C_4$ plants are characterized in that the conversion of carbon dioxide into biomass is particularly effective, that the specific yield is particularly high and especially that less fertilizing is required. The latter characteristic has special importance within the framework of the invention, since due to the lesser amounts of fertilizers the negative effects of sulfur, chlorine and alkali compounds are considerably reduced. A biomass production module is an agricultural surface where the biomass is grown. Advantageously the biomass production module has a pelletizing device. A reformer is allothermic when the process heat required for the gasification reaction is supplied from the outside. The dwelling (residence) of the biomass in the reformer can be easily set by selecting and adjusting the velocity of the oncoming flow of steam, the operating pressure, the temperature zone distribution, as well as the particle size of the biomass. The optimal tuning of the parameters according to feature d) is also easily established through tests. A higher operating temperature of the fuel cell requires a higher water content in the purified fuel gas in order to keep the polymer membrane sufficiently moist. Hereby again the calorific value of the fuel gas is reduced. A reduction of the calorific value of the fuel gas can be compensated by increasing the pressure of the purified fuel gas. The mutual adjustment of the parameters according to feature d) can also take place by taking into consideration the carbon monoxide content of the purified fuel gas, as far as within the limits of feature c) significant amounts of carbon monoxide are actually produced. The power density is higher as the carbon monoxide content of the purified fuel gas is lower. Higher contents of carbon monoxide can be compensated by a higher operating temperature of the fuel cells. The operating temperature of the fuel cell has in any case to remain always below the vitrification temperature of the polymer membrane.

In a preferred embodiment of the process the plants are fertilized so that they do not contain ammonium sulfate or potassium chloride. As a result the content of sulfur and chloride in the biomass is very low. The potassium content is also reducible, even if to a smaller extent.

The reformer can be fluidized bed reactor and is operated at a temperature of 650 to 900° C., preferably at approximately 750° C., and a pressure of 1.5 to 5 bar, preferably approximately 3 bar. The dwelling time of the biomass in the reformer is set so that the tar content of the crude gas lies below 0.1%. Under these operating conditions the crude gas is practically free of the negative effects of tar, as well as of alkali compounds. When the reformer is operated at an optimal level the tar content can even be brought down to 0.5 ppm Therefore it is particularly important that the tar forked during the gasification of the biomass be quantitatively and qualitatively different from the tar formed during the carbon gasification. Tar originating from the biomass gasification is more easily decomposed or gasified in the reformer. Besides in the reformer and/or the ducts of the reformer module no slagging or caking of material due to alkali compounds takes place. Alkali-containing fine dust still entrained by the crude gas in the smallest amounts can be separated from the crude gas by means of a filtering device, e.g. a cyclone filter.

In a preferred embodiment of the invention in the reformer a crude gas is produced with approximately equal volumes of hydrogen and carbon monoxide, by setting the mass ratio steam/biomass at less than 0.3. It is also possible to work with a setting of the mass ratio steam/biomass at 1.3. Then the hydrogen/carbon monoxide volume ratio will be higher than 3. In both cases the formation of purified fuel gas in the crude gas processing module takes place by alternating reduction of an oxidized metal sponge by means of the crude gas and subsequent oxidation of the reduced metal sponge by leans of steam. Spongy iron is advantageously used as the metal sponge. However it is also possible to work with other nonprecious metals, such as zinc or manganese. During the reduction of the oxidized metal sponge, the reduction through oxidation of hydrogen to water, as well as of carbon monoxide to carbon dioxide take place. During the oxidation of the reduced metal sponge with steam, hydrogen is formed. As a result in the example a purified fuel gas is created which consist of hydrogen and steam, and is basically free of other components. As a rule the steam does not have disturbing effects in the purified fuel gas;, since during the operation of a PEM fuel cell water has to be supplied anyway, in order to preserve the moisture of the polymer membrane. It is self-understood that the water content of the purified fuel gas can be optimized through partial condensation.

In another embodiment in the reformer a crude gas is produced with a volume ratio of hydrogen/carbon monoxide higher than 3, by setting the mass ratio of steam/biomass at more than 1.3, whereby the formation of the purified fuel gas in the crude gas processing module is performed through the enrichment of the hydrogen up to 99% by volume in the purified fuel gas by means of the PSA method with at least two adsorption reactors and whereby the purified fuel gas is charged with the amounts of steam required for the continuous operation of the PEM fuel cells. The term "PSA" stands for "pressure swing adsorption". In the PSA method a first adsorption reactor is traversed by the crude gas under high pressure. Thereby the hydrogen of the crude gas is considerably less adsorbed than the further, mostly polar, components of the crude gas due to its chemical-physical properties. As result from the first adsorption reactor emerges a purified fuel gas with the indicated hydrogen content. A second adsorption reactor, operated in the same manner which was just described, is relieved in counterflow direction, whereby the undesirable adsorbed components of the crude gas flow out. Optionally the second adsorption reactor can be rinsed, for instance with purified fuel gas. Preferably the adsorption reactors are built as molecular sieve reactors. Since practically the purified fuel gas does not contain any other components besides the hydrogen, it is necessary to add steam in order to prevent the polymer membrane of the PEM fuel cells from drying out. If the reformer is operated according to this embodiment example, then at 750° C. and 3 bar a crude gas can be produced with approximately 0.29% methane, approximately 18% carbon monoxide, approximately 20% carbon dioxide and approximately 62% hydrogen. Even if a reaction equilibrium is not established in the reformer, as a rule the methane content amounts to less than 7% (gas contents are always considered in % by volume). Hereby it is particularly important that the methane content is so low, which insures that a good energy yield is achieved and whereby an expensive methane removal can be dispensed with. If still necessary, a methane separation device of a simple type and small dimensions can be provided. The low methane content in the crude gas can amounts to no more than 7% by volume, but in most cases is considerably less than that.

The apparatus is based on a modular construction as well as a connection between the modules forming a system in which the adjustment of the operating conditions required by the parameters can be set in the individual modules so that the system can be optimally operated. Particularly it in possible to set up automatic systems and control circuits between the reformer module and the crude gas processing module, on the one hand, and the crude gas processing module and the converter module, on the other hand. As a result, from the point of view of control technique, the generation of current in the converter module is extensively decoupled from the production of crude gas in the reformer module. The metal sponge can function additionally as an intermediate hydrogen storage medium. In another example, for the purpose of the mentioned control technique decoupling, it is possible to add a hydrogen storage of common construction in the crude gas processing module. As a result the process according to the invention works with considerably improved efficiency. The energy content of the biomass is optimally utilized.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
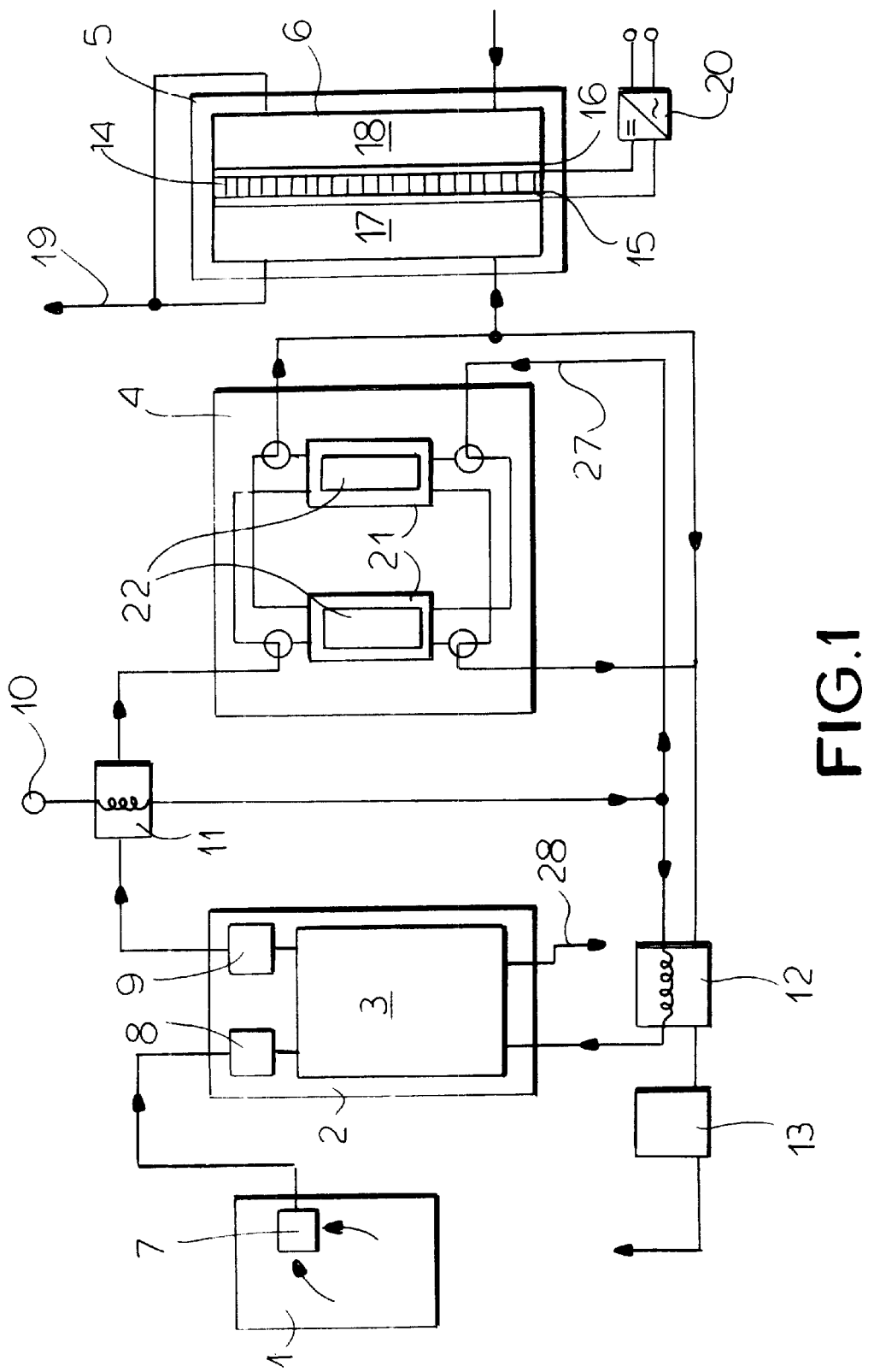
FIG. 1 is a diagram of a system for the implementation of the method of the invention with metal sponge reactors in the raw gas processing module.
Figure 2:
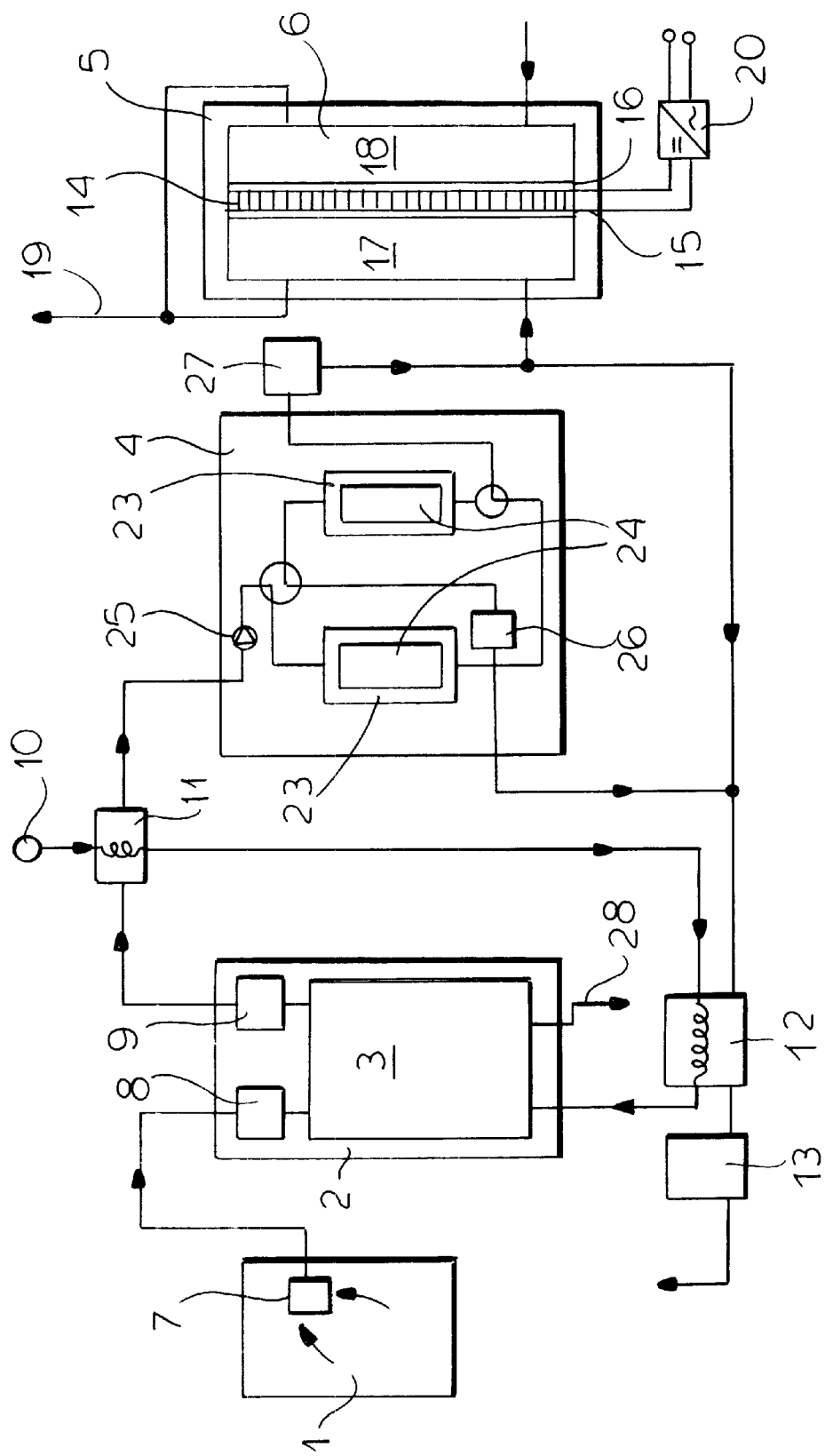
FIG. 2 is a diagram of a system for the implementation of the method of the invention with adsorption reactors in the crude gas processing module.

The invention according to FIGS. 1 and 2 as a basic invention according to FIG. 1 and FIG. 2 as a basic construction has a biomass production module 1, a reformer module 2 with at least one allothermic reformer 3, a crude gas processing module 4 and a converter module 5 with at least one PEM fuel cell 6.

Within the biomass production module 1 a pelletizing device 7 is provided. Within the reformer module 2 at least one dosage apparatus 8 for the dosage of the biomass and a filtering device 9 for the separation of fine dust from the crude gas are provided. Steam is supplied through the steam supply line 10 to the allothermic reformer 3, in the amount required for the optimal gasification of the biomass. The steam is brought to the required temperature by heat exchangers 11 and 12. The heat exchanger 11 is operated with the heat of the crude gas. The heating of the steam in the heat exchanger 12 is affected by the burning of a part of the purified fuel gas and/or the exhaust gas from the crude gas processing module 4. It is self-understood that if necessary the exhaust gas resulting from this burning is processed in an exhaust gas cleaner 13 to become environmentally safe.

The fuel cell has a polymer membrane 14, as well as an anode 15 and a cathode 16. The purified fuel gas is guided over the anode 15 in the anode chamber 17. At the cathode a cathode chamber 18 is arranged, through which an oxidizing agent, for instance atmospheric oxygen, is passed. From the waste gas outlet 19 of the converter module 5 water or respectively steam, which is practically free of noxious substances polluting the environment, can be discharged. At the anode 15 and the cathode 16 a current inverter 20 is connected for the production of the normal alternating network current.

In the embodiment of FIG. 1 the crude gas processing module 4 has at least two metal sponge reactors 21 with metal sponges 22. In the embodiment example the metal sponges 22 are made of sponge iron. The crude gas processing module 4 is connected via a system connection 27 to the steam supply line 10. The ducts and the switchable valves for the alternating oxidation and reduction of the two metal sponge reactors are arranged in the schematically indicated manner.

In the embodiment of FIG. 2 the crude gas processing module 4 has at least two adsorption reactors. These are equipped with molecular sieves 24. Further at least one condenser 25, as well as a pressure relief device 26 are arranged. The purified fuel gas emerging from the crude gas processing module 4 is set at the desired pressure and at the desired water content in a pressure-adjusting and moisturizing device 27.

The method of the invention can be performed in the following manner with both of the systems according to FIG. 1 or FIG. 2. In the biomass production module 1, biomass is produced by growing perennial $C_4$ plants. The plants are fertilized without ammonium. sulfate and potassium chloride and biomass which can be produced from these plants has a low sulfur and chloride content. This biomass is shaped into pellets in the pelletizing device 7. The biomass pellets are gasified in The reformer module 2 into a crude gas containing hydrogen. The reformer module 2 works with at least one allothermic reformer 3, whereby the reformer 3 is supplied with steam as a gasifying leans. The residence time of the biomass and/or of the crude gas in the reformer 3, as well as pressure and temperature in the reformer 3 are adjusted so that the alkali compounds originating from the biomass can be discharged from the reformer together with the resulting ash and that the tar formed as an intermediate product is basically gasified into carbon oxides and hydrogen in the reformer 3. The ash is removed from the reformer 3 via the ash outlet 28.

The reformers 3 are built as fluidized bed reactors and are operated at a temperature of 750° C. and a pressure of approximately 3 bar. The residence time of the biomass in the reformer 3 is set so that the tar content of the crude gas lies below 1.5 ppm. After the removal of the., entrained fine dusts containing alkali in the filtering device 9, the resulting crude gas is directed towards the crude gas processing module 4, for the formation of purified fuel gas. In the crude gas processing module the purified fuel gas is formed with a high hydrogen content and a content of carbon oxides of less than 5 ppm. In the converter module 5 electric energy is generated from the purified fuel gas. The conversion into electric energy of the purified fuel gas takes place by means of at least one PEN fuel cell 6, whereby the operating temperature of the fuel cell 6, the water content of the purified fuel gas and the pressure of the purified fuel gags are adjusted with respect to one another in order to produce optimal power density.

The system according to FIG. 1 can be operated so that in the reformer 3 a crude gas with approximately equal parts of hydrogen and carbon monoxide is produced by setting the mass ratio steam/biomass to less than 0.3. From this crude gas the purified fuel gas is produced in the crude gas processing module 4 through alternating reduction of an oxidized metal sponge 22 by means of crude gas and a subsequent oxidation of the reduced metal sponge 22 by means of steam. This modus operandi is particularly advantageous from the energy point of view, because very little steam is required.

In the system according to FIG. 2 in the reformer 3 a crude gas with hydrogen/carbon monoxide ratio of more than 3 is produced, by setting the mass ratio steam/biomass at more than 1.5, whereby the formation of the purified fuel gas in the crude gas processing module 4 is performed by enriching the hydrogen to at least 99% by volume in the purified fuel gas by means of the PSA method with at least two adsorption reactors 23. The PSA method can be performed so that the hydrogen can be enriched up to 99% by volume and more. In the pressure-regulating and moistening device 27, the purified fuel gas is charged with the amount of steam required for the continuous operation of the PEN fuel cell 6.

What is claimed is:

1. A method of generating electric energy from a regenerative biomass produced from perennial $C_4$ plants, whereby in a biomass production module biomass is produced, whereby in a reformer module the biomass is gasified into a crude gas containing hydrogen, whereby in a crude gas processing module from the crude gas a purified fuel gas with a hydrogen content higher than a hydrogen content of said crude gas is formed and whereby in a converter module electric energy is generated from the purified fuel gas, wherein:

a) with the biomass production module a biomass with is produced through fertilization, b) the reformer module works with at least one allothermic reformer supplied with steam as a gasifying means, whereby the residence time of the biomass and/or the crude gas in the reformer, pressure and temperature its the reformer are set so that the alkali compounds originating from the biomass discharged from the reformer with resulting ash, and whereby tar resulting as an intermediate product in the reformer is gasified into carbon oxides and hydrogen, c) in the crude gas processing module a purified fuel gas is produced with a content of carbon oxides lower than 1%, and d) the purified fuel gas is converted into electrical current in the converter module by means of at least one PEN fuel cell, the operating temperature of the PEM fuel cell, the water content of the purified fuel gas and the pressure of the purified fuel gas are adjusted relative to one another in order to produce the electrical energy power density.

2. The method according to claim 1, whereby the plants are fertilized without ammonium sulfate and potassium chloride.

3. The method according to claim 1, whereby the reformer is a fluidized bed reactor operated at a temperature of 650 to 900° C. and a pressure of 1.5 to 5 bar.

4. The method according to claim 1, whereby the residence time of the biomass in the reformer is set so that a tar content of the crude gas lies below 0.1%.

5. The method according to claim 1, whereby an alkali-containing dust entrained with the crude gas is separated from the crude gas by means of a filtering device.

6. The method according to claim 1, whereby in the reformer a crude gas is produced with substantially equal parts by volume of hydrogen and carbon monoxide by setting a steam/biomass mass ratio at less than 0.3 and whereby the formation of the purified fuel gas in the crude gas processing module takes place through the alternating reduction of an oxidized metal sponge by means of the crude gas and the subsequent oxidation of the reduced metal sponge by means of steam.

7. The method according to claim 1, whereby in the reformer a crude gas is produced with a hydrogen/carbon monoxide ratio by volume of more than 3 by setting a mass ratio steam/biomass at higher than 1.3 and whereby the formation of purified fuel gas in the crude gas processing module takes place through the alternating reduction of an oxidized metal sponge by means of crude gas and subsequent oxidation of the reduced metal sponge by means of steam.

8. The method according to claim 1, whereby in the reformer a crude gas with a volume ratio of steam/carbon monoxide of more than 3 is produced by setting a mass ratio steam/biomass at more than 1.3, whereby the formation of the purified fuel gas in the crude gas processing module is carried out through the enrichment of hydrogen to at least 99% by volume in the purified fuel gas by means of the PSA-method with at least two adsorption reactors and whereby the purified fuel gas is charged with the amount of steam required for the continuous operation of the PEM fuel cells.

9. A device for producing electrical energy for a biomass comprising a biomass production module for the production of biomass, a reformer module for the gasification of the biomass with steam into crude gas containing hydrogen, a crude gas processing module for the formation of a purified fuel gas with essentially hydrogen and steam from the crude gas, the crude gas processing module being provided with at least two metal sponge reactors, with a steam connection as well as with lines with switchable valves for the alternating oxidation, respectively reduction of the metal sponges in the metal sponge reactors, and with a converter module with at least one PEM fuel cell for the production of electric energy from the purified fuel gas.

10. A device for producing electrical energy a biomass comprising a biomass production module for the production of biomass, a reformer module for the gasification of biomass with steam into a crude gas containing hydrogen, with a crude gas processing module for the formation from the crude gas of a purified fuel gas with at least 99% by volume hydrogen, the crude gas processing module having at least two molecular sieve adsorption reactors, with at least one condenser and with lines with switchable valves and a pressure relief device for the alternating cleaning of the crude gas in one of the adsorption reactors under pressure or for rinsing of the other adsorption reactor through pressure relief, as well as with a converter module with at least one PEM fuel cell for generating electric energy from the purified fuel gas, whereby the fuel cell is preceded by a device for moistening the purified fuel gas.

\* \* \* \* \*